United States Patent [19]

Cook et al.

[11] 4,434,191
[45] Feb. 28, 1984

[54] INTEGRAL ANTI-REFLECTIVE SURFACES OF SILICATE GLASSES

[75] Inventors: Lee M. Cook, Kingston; Karl-Heinz Mader, Clarks Summit, both of Pa.; Roland Schnabel, Hofheim, Fed. Rep. of Germany

[73] Assignee: Schott Glass Technologies, Inc., Duryea, Pa.

[21] Appl. No.: 309,149

[22] Filed: Oct. 6, 1981

[51] Int. Cl.$^3$ ............................................. B05D 5/06
[52] U.S. Cl. .................................. 427/165; 427/169; 427/299; 427/336; 427/337; 427/343; 427/352; 428/410; 428/426; 428/432
[58] Field of Search ............... 427/165, 169, 299, 343, 427/352, 337, 336; 428/410, 426, 432

[56] References Cited

U.S. PATENT DOCUMENTS

| | | | |
|---|---|---|---|
| 2,348,704 | 5/1944 | Adams | 156/651 |
| 2,486,431 | 11/1949 | Nicoll et al. | 156/663 |
| 2,490,662 | 12/1949 | Thomsen | 156/626 |
| 4,019,884 | 4/1977 | Elmer et al. | 65/30 R |

FOREIGN PATENT DOCUMENTS 698831 10/1953 United Kingdom .

OTHER PUBLICATIONS

Schroeder, Intern. Cong. on Glass, vol. 8, pp. 118–123 (1974).
Lowdermilk et al., Laser Focus, p. 3, Dec. 1980, pp. 64–70.
Elmer et al., Ceramic Bulletin 58, No. 11, 1979.
Lowdermilk et al., Appl. Phys. Lett. 36(11), 1980, pp. 891–893.
Douglas et al., J. Am. Ceramic Soc. 50, No. 1, (1967), 1–8.
Sanders et al., (I), Ceramic Bulletin 52, No. 9, (1973), 662–669.
Sanders et al., (II), J. Am. Ceramic Soc. 56, No. 7, (1973), 373–377.
Bulletin of Am. Ceramic Soc., vol. 60, #3 (1981), p. 407, abstracts 1-G-81 and 2-G-81.

*Primary Examiner*—Ellis P. Robinson
*Attorney, Agent, or Firm*—Millen & White

[57] ABSTRACT

Glass surfaces are modified using controlled chemical corrosion to reduce reflection for a variety of existing optical and ophthalmic silicate glass compositions containing at least 5 weight % of alkali metal, using neutral or slightly alkaline aqueous solutions (pH: 7.0-8.5) at temperatures of 20°-100° C. The solutions contain an electrolyte having a dissociation constant greater than $10^{-6}$ and contain a polyvalent metal ion. Selection of the proper range of the ratio of glass surface area treated to treating solution volume is critical for achieving satisfactory results for optical applications as well as for making the process simple, repeatable, and inexpensive.

Using this invention, antireflective surfaces may be produced on optical devices of complex configuration with high uniformity. Such surfaces provide substantially improved performance in high energy laser systems where exposure to laser light of extremely high intensity and short duration will destroy or degrade conventionally applied coatings.

19 Claims, 18 Drawing Figures

Schematic diagram of AR coating

Reflectance as a function of film index $n_1$ = refractive index of surface film

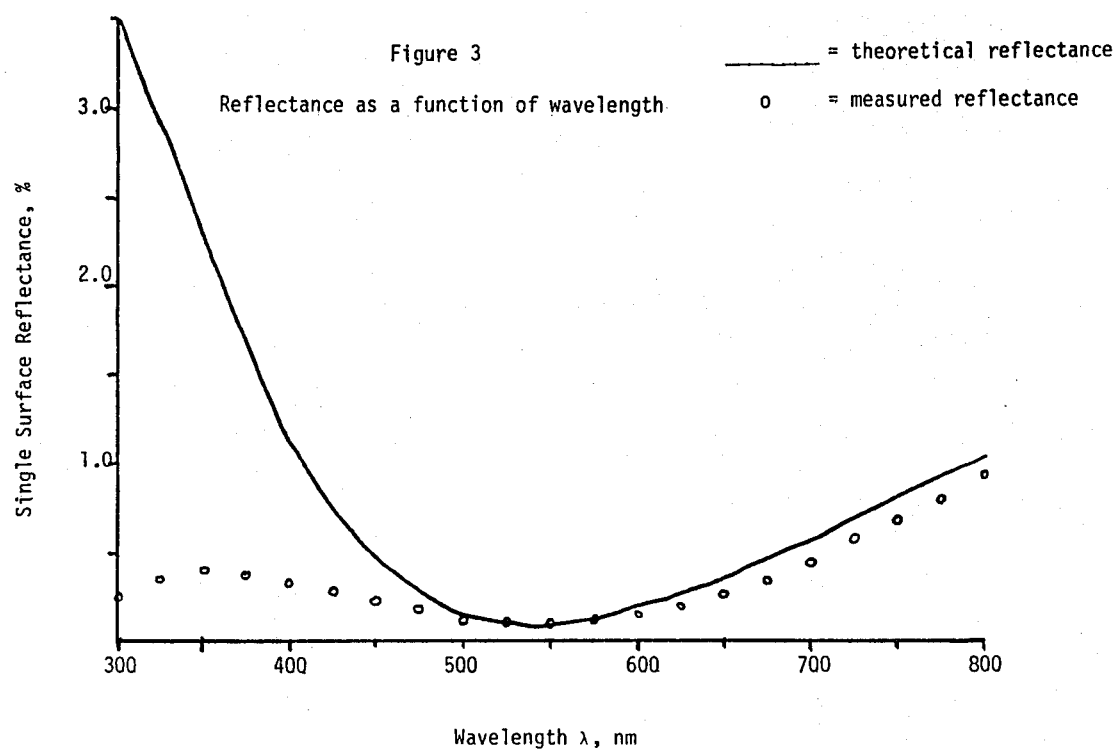
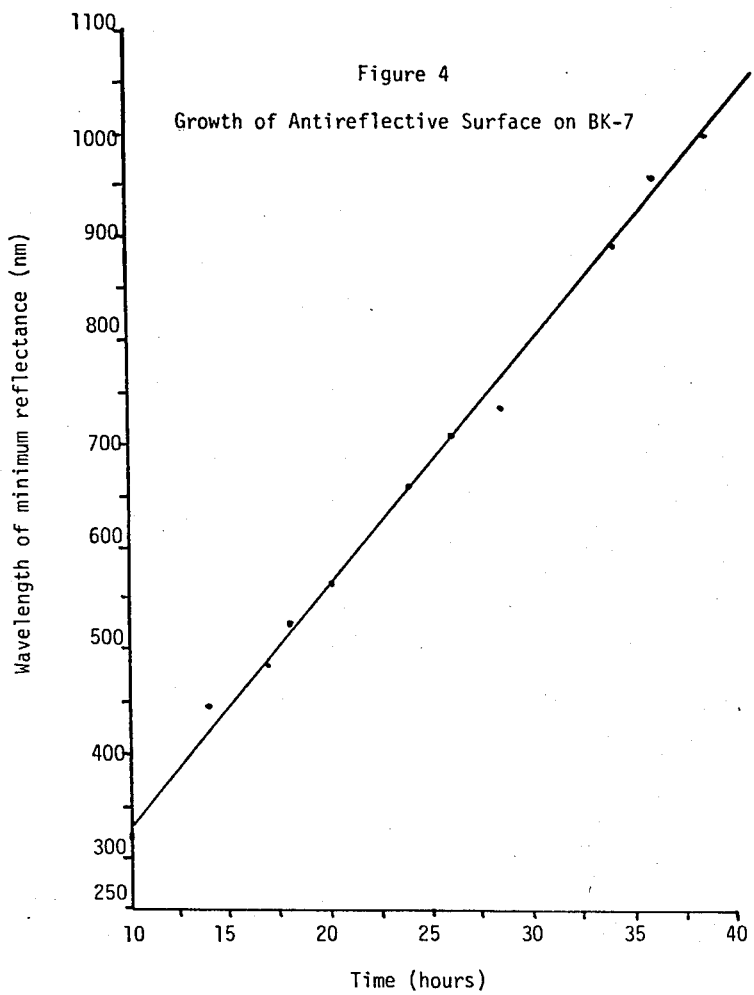

Integral Antireflective Film Formation as a function of surface/volume ratio - BK-7

Integral Antireflective Surface on BK-7

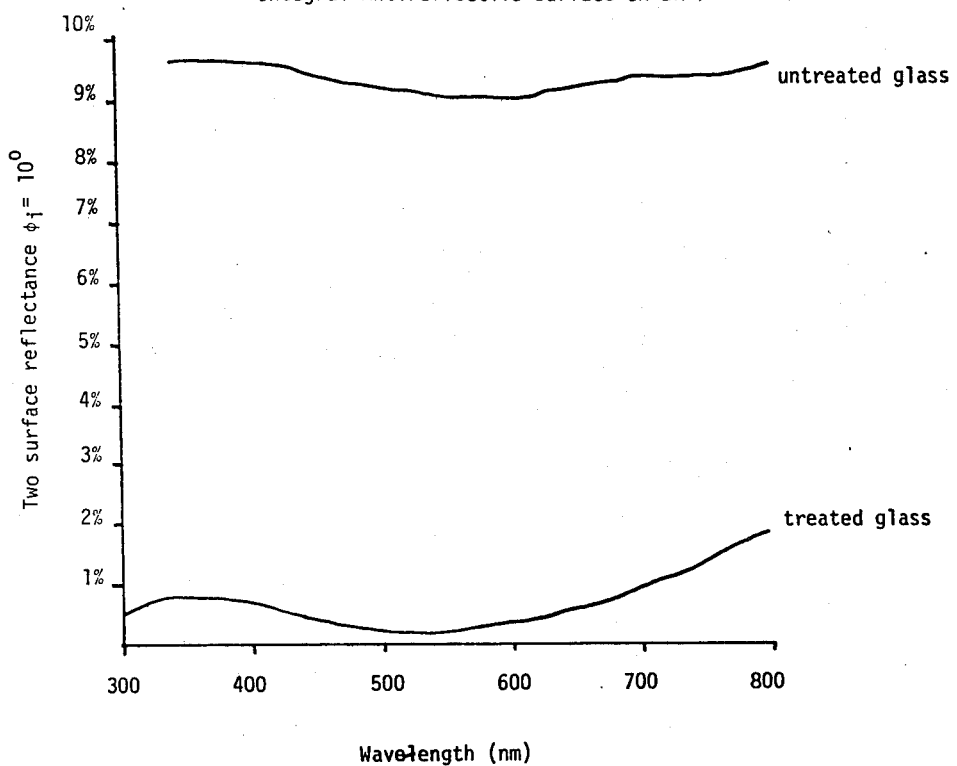
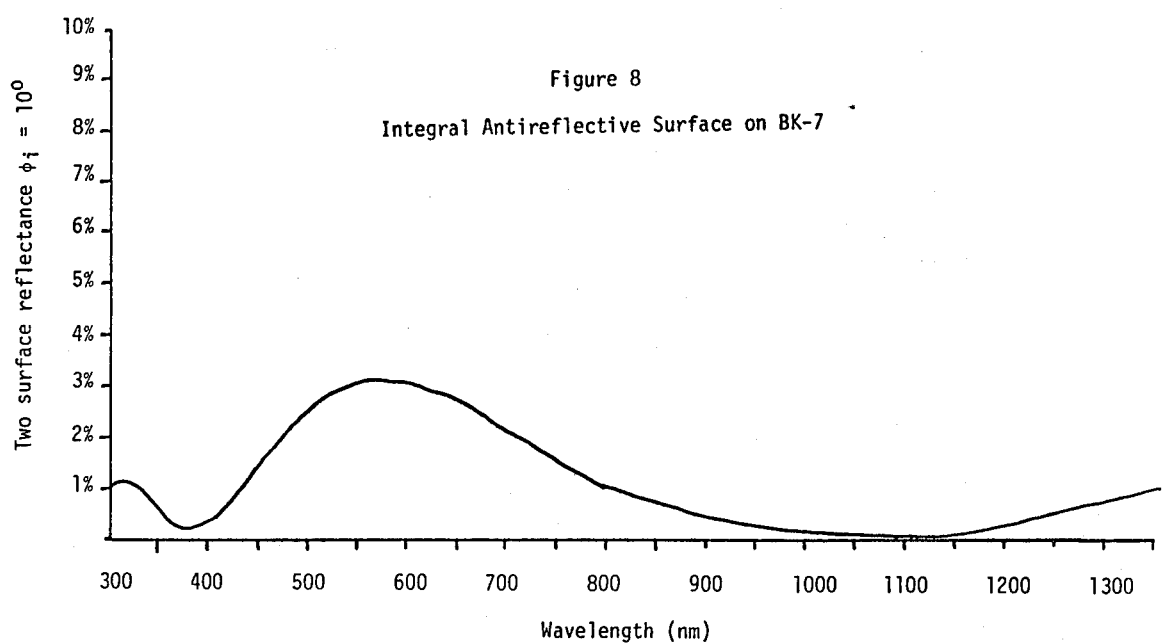

Integral Antireflective Surface on S-1 Crown Glass

Integral Antireflective Surface on Chemically Strengthened S-1 Crown Glass

Integral Antireflective Surface on UV Haze Photofilter Glass

Integral Antireflective Surface on ED-3 Laser Glass

Integral Antireflective Surface on BK-7 Sample for Laser Damage Testing

Removal of Integral Antireflective Surfaces - BK-7

Reapplication of Integral Antireflective Surface - BK-7

INTEGRAL ANTI-REFLECTIVE SURFACES OF SILICATE GLASSES

BACKGROUND OF THE INVENTION

This invention relates to an improved technique for coating silicate glass surfaces with an antireflection (AR) layer, i.e., for reducing specular surface reflection, especially for surfaces used in high energy laser systems.

It has long been known that the reflectance of light from glass surfaces can be reduced by chemical modification. Such techniques remove leachable components from the glass, leaving behind a porous skeletal layer of a depth approximately ¼ the wavelength of the light to be transmitted, or an odd multiple thereof. Virtually all such chemical treatments have utilized complex acidic solutions and procedures optimized for one particular type of glass. Early work was performed almost entirely on optical glasses containing large amounts of lead or barium. Glasses containing only silica, alkaline earth metals, alkali metals and/or boron oxide (soda-lime and borosilicates) were not considered suitable for treatment. These processes used acidic solutions to remove the heavy metal ions (which modify the refractive index) by exchange of protons for the heavy ions. In almost all cases, the resulting surface was only moderately effective and specular reflectance could only be reduced by 50 percent. Further reduction in reflectance was effected by immersing the glass sample in a second bath containing HF or fluorides. (U.S. Pat. No. 2,348,704).

A later process using acidic solutions (U.S. Pat. Nos. 2,486,431 and 2,490,662) utilized complex silica saturated solutions of fluosilicic acid to produce antireflective surfaces on soda-lime and optical crown glasses. However, the process did not provide efficient reduction of reflectance for borosilicate compositions. Additionally, the complex nature of the process resulted in a lack of reproducibility and the chemical instability of the resultant surfaces hindered its practical utility.

A more recent process utilizes the difference in chemical reactivity of two different phases in heat treated borosilicate glasses of specific and limited compositions to produce leached antireflective layers using acidic solutions (U.S. Pat. No. 4,019,884). While possessing a very broad wavelength range of antireflective behavior, the process has the major disadvantage of requiring borosilicate glasses of relatively low chemical resistance. These are not conventional optical glasses. Normal optical glasses cannot be treated by this process. The nature of this phase separation process also causes significant light scattering effects in both the antireflective surface layer and in the bulk glass, further limiting its utility. In addition the AR coatings require careful handling.

All of these processes are disadvantageous in that they require acid treatments. Furthermore, they are highly limited by poor reproducibility, poor surface durability and/or low optical quality, etc. All are inapplicable to relatively large optical surfaces since inevitably unevenness is introduced which changes the optical figure.

The only subtractive chemical treatment process utilizing neutral or nearly neutral solutions was described by Schroeder. See West German Patent Nos. 821,828 and 964,095, British Pat. No. 698,831 and Schroeder, Intern. Cong. on Glass, Vol. 8, pp. 118-123 (1974). However, as for all the classical etch/leach processes, the Schroeder method has been found by the art to be highly disadvantageous and not applicable to situations having stringent requirements, e.g., optical uses. These negative findings include poor reproducibility, low optical quality, uneven application on large articles, sensitivity to contamination, mechanical instability of the layers, low durability, inter alia. Thus, they have never been employed practically or industrially. For specific comments in this regard, see Lowdermilk et al., Laser Focus, December 1980, p. 64-70, especially pp. 64 and 68; Elmer et al, Ceramic Bulletin 58, No. 11, 1979, pp. 1092-1097, especially p. 1092, Lowdermilk et al, Appl. Phys. Lett. 36(11), 1980, pp. 891-893, especially p. 891; and Holland, "The Properties of Glass Surfaces," Chapman & Hall, London 1966, p. 155; whose disclosures are incorporated by reference herein.

Furthermore, in laser applications, especially high energy laser applications, provision of non-reflective surfaces is especially critical and difficult. For some high energy laser systems, the AR surfaces are the feature limiting the achievement of higher power densities. Current methods include the coating of optical elements with antireflective added-on layers, e.g., based on interference phenomena. However, these layers are quite limited in their resistance to higher power levels and are useful over only a relatively narrow bandwidth. In addition the phase separated glasses mentioned above have been utilized. See, e.g., Lowdermilk et al, Lowdermilk et al and Elmer et al, supra. However, all these approaches have the significant disadvantages discussed above and in these references.

Thus, the problem exists to provide a method for rendering antireflective a wide range of optical surfaces in terms of shape and composition, and in such a manner that the resultant surfaces are useful for a broad range of optical applications.

SUMMARY OF THE INVENTION

Accordingly, it is an object of this invention to provide a method for producing such surfaces, whereby the disadvantages mentioned above are lessened or eliminated.

It is another object to provide such a method which is applicable to large objects.

It is yet another object to provide such a method which has the capability of repairing the antireflective surfaces produced should they become damaged and of removing them when desired.

It is another object to provide the high optical quality antireflective components produced by this method and having high durability, being of reproducible optical properties, being resistant to damage by high power densities such as those provided by high energy lasers, inter alia.

Upon further study of the specification and appended claims, further objects and advantages of this invention will become apparent to those skilled in the art.

These objects have been achieved by providing the method of this invention which is based on the discovery that neutral or slightly alkaline solutions of electrolytes having a dissociation constant at 20° C. of greater than $10^{-6}$, a pH of 7.0 to 8.5, e.g., buffered to provide a constant hydroxyl ion concentration, and which contain a relatively low concentration of polyvalent metal ions (e.g., $Al^{+3}$ in colloidal dispersion), may be used to substantially reduce the specular reflectance of a wide variety of optical and ophthalmic silicate glasses in a reproducible and simple manner, and that the resultant antireflective glasses have a high resistance to damage from high power densities, as well as the other properties described above. This is achieved by proper selection of the ratio of glass surface area treated to volume of treating solution (S/V). It has been discovered that this parameter is critical to the successful use of the method to achieve the above-described results. This ratio must be maintained constant for batch to batch reproducibility and must be selected such that the growth rate of the AR layer is appropriate for the production of optically satisfactory AR surfaces. Too fast or too slow a growth rate will deleteriously affect uniformity, durability, optical quality, reproducibility, etc.

Thus, this invention relates to a method of preparing an AR surface on a silicate glass surface containing at least 5 wt % of alkali metal, comprising treating the surface with an aqueous solution of pH 7.0-8.5 which contains an electrolyte with a dissociation constant at 20° C. greater than $10^{-6}$ and contains a polyvalent cation, wherein the treatment step is conducted with a ratio of glass surface area to treatment solution volume which permits preparation of AR surfaces which are uniform, durable and reproducible from batch to batch. By simply controlling S/V this process, in turn, becomes highly controllable. For example, the wavelength or wavelength range of minimum reflectance ($\lambda m$) can be readily preselected; the treatment time required to attain a given $\lambda m$ can be readily preselected; for a given glass composition, multiple articles can be fabricated with the same $\lambda m$ or with preselectable, different $\lambda m$'s—all by control of S/V.

One of the primary properties of the resultant AR coated articles is the surprising durability of the AR surfaces. Instead of the heretofore disadvantageous surfaces of low durability, uniformity, reproducibility etc., there are obtained surface so durable, uniform and stable that they can be successfully and repeatably used with very high energy lasers.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 3 depicts reflectance as a function of wavelength;

FIG. 4 shows the growth of an antireflective surface on BK-7 glass in terms of minimum reflectance wavelenth vs time;

FIGS. 6-13 show integral antireflective film formation as a function of wavelength for various glasses and/or treatment conditions;

DETAILED DESCRIPTION

Figure 1:
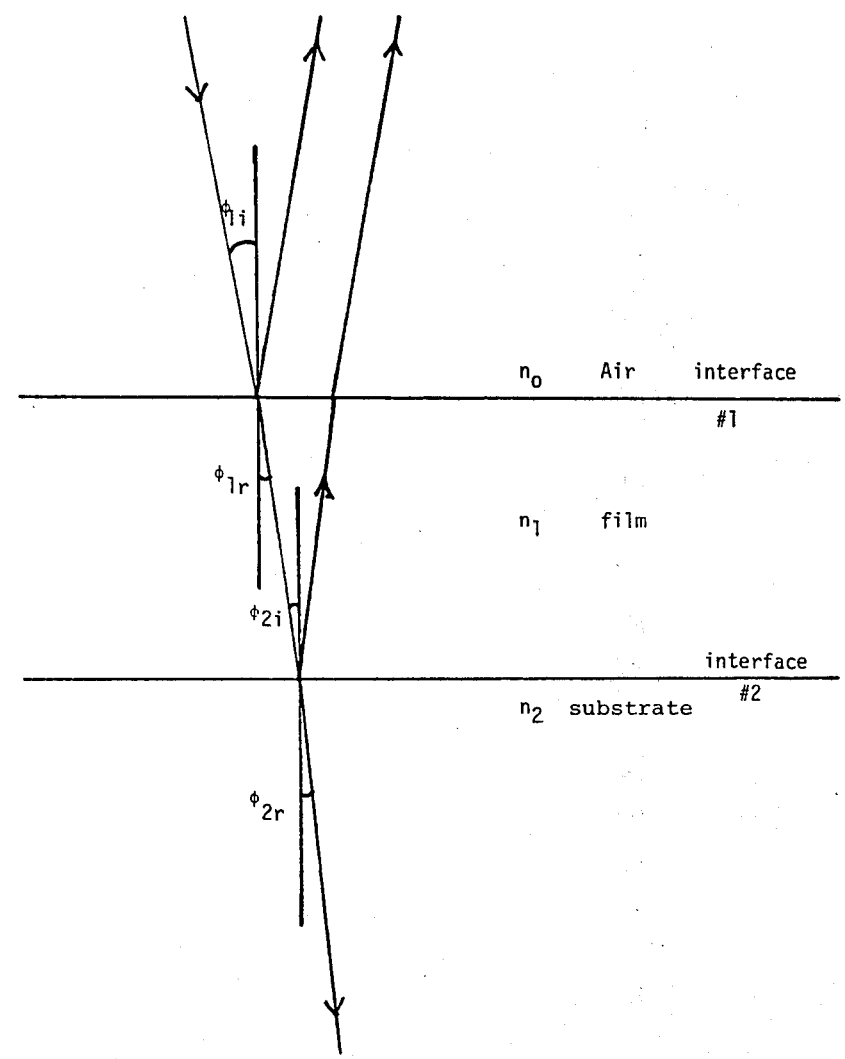
FIG. 1 is a schematic diagram of an AR coating.

The surface layers produced by the method of this invention possess reflection characteristics which are similar to those of applied antireflection coatings of thicknesses $\lambda/4$ where $\lambda$ is the wavelength of minimum reflectance. However, they are significantly superior to such coatings for the reasons discussed above and in that their effective bandwidth of low reflectance is much broader than would be expected for uniform surface layers of the resultant calculated refractive index. This is a consequence of the method of production of the antireflective layer.

The durability and other properties of the antireflective layers achieved by this invention is especially surprising in view of the prior art prejudice discussed above. Moreover, the resulting antireflective glass components per se are of a heretofore unachievable combination of high durability (e.g., to high power densities) and good antireflective character.

Quite surprisingly, this invention makes it possible to create a porous, laser resistant AR layer without a preceding phase separation as required by current, state of the art methods. This avoids the disadvantageous influence of such phase separations on later use, including e.g., the induction of light scattering which leads to transmission losses, particularly at short wavelengths. The desired improved transmission which is to be achieved by the prior art porous AR layer is at least partially lost thereby.

Details of many aspects of the treatment of this invention can be found by reference to British Pat. No. 698,831, West German Patent Nos. 821,828 and 964,095, Schroeder, Glastechn. Ber. 26, 91 (1953), and Schroeder, Intern. Cong. on Glass, Vol. 8, pp. 118–123 (1974), the entire disclosures of all being incorporated by reference herein. Except as indicated otherwise herein, all of the treatment steps of this invention are carried out in accordance with the disclosures of these references.

The process of this invention may be used to treat a wide variety of glass types. Suitable glasses have a silicate glass matrix and contain at least five weight %, e.g., 5-20 weight %, of alkali metals (e.g., Li, Na, K, Cs). The general $SiO_2$ content is 35-80 weight %, typically 50-70 weight %. The presence of any other component conventional in such silicate compositions is permissible in conventional amounts. However, it must be borne in mind that very high contents of $Al_2O_3$ (e.g., greater than 10 weight %) can severely inhibit the rate of reaction by which the antireflective surface is formed. Silicate glasses are well known and include e.g., lead flint glasses (F-2, F-7, S-8100); normal crown glasses (S-1), including most ophthalmic, window and bottle glass compositions; borosilicates (BK-3, BK-7, BK-10, Pyrex); etc. (Letter-number combinations are Schott Optical commercial designations.) See also, Kirk-Othmer Encyclopedia of Chemical Technology, 2nd ed., Vol. 10, 533–604, Wiley & Sons (1966), which is incorporated by reference herein.

In theory, any electrolyte which satisfies the requirement of a dissociation constant at 20° C. which is greater than $10^{-6}$ can be employed. The nature of the particular electrolyte is not critical as long as it is system compatible, e.g., does not deleteriously affect the resultant glass components. Several suitable electrolytes have been disclosed in the references incorporated above. These include $Na_2HAsO_4$, $Na_2HPO_4$, $NaCl$, $NaOOCCH_3$, etc. Many others are possible. In general, suitable concentrations of such electrolytes are in the range of 0.01–1 M, preferably 0.01–0.1 M. Typical dissociation constants are in the range of $>10^{-6}$ up to about $10^{-2}$ (20° C.).

The pH of the aqueous solution is a most important feature for this invention. As long as the pH is in the proper range and S/V is selected appropriately, amounts of electrolyte and/or polyvalent ion can vary widely as long as their compositions and amounts are system compatible and effective. pH's are in the range of about 7 to about 8.5, preferably 7.5–8.0. Any method of maintaining the pH in the required range can be used. Preferably, system compatible conventional buffering systems are employed; most preferably, the electrolyte per se provides the buffering action.

The anion associated with the polyvalent (preferably trivalent) ion required for the method of this invention is not critical. It is only necessary that it be system compatible, i.e., not produce any deleterious effects with respect to the process itself or the resultant glass components. Any polyvalent ion which can be solubilized or otherwise effectively contained in the aqueous solution can be employed, e.g., by colloidal dispersion, emulsification, suspension, etc. It is only necessary to provide the ion in a state in which it is available for absorption into the surface layer in a constant supply.

The preferred cation is trivalent aluminum as throughly discussed in the references incorporated above, e.g., provided in the form of $AlCl_3.3H_2O$. Other suitable polyvalent ions include $Fe^{+3}$, $La^{+3}$, $Nb^{+3}$, $Cr^{+3}$, $Co^{+3}$, $Co^{+2}$, $Ni^{+2}$, $Zn^{+2}$, etc. Typically, the concentration of the polyvalent ion is the same as or up to 1000 times lower than the concentration of the electrolyte, preferably about 10 times lower. Even lower amounts can be effective. A trivalent cation which is not solubilized in the aqueous solution or which is not by itself colloidally dispersed can be rendered effective in the aqueous solutions of this invention by emulsification or suspension using conventional emulsifiers or suspension agents which are system compatible in the same sense as this term has been used above.

The temperature of the surface treatment of this invention is not critical as long as it is compatible with the system, e.g., it is generally lower for an easily corroded glass. Generally, temperatures of 20°–100° C. are utilized. Similarly, treatment times per se are not critical but are chosen to achieve the desired results with a given system as fully illustrated below. In general, the broad range of possible times is 6–120 hours; times generally vary inversely with temperature. The most useful time range is 12 to 90 hours.

The primary basis underlying the present invention is the discovery that the ratio S/V is a most important parameter for achieving a predetermined set of results using the method of this invention. That is, unless the S/V ratio is selected appropriately, the properties of the resultant AR surface-containing optical element will be inferior and unacceptable for most optical applications and certainly for those having stringent requirements such as the durability and resistance to damage needed for high energy laser systems. In essence, the S/V ratio must be suitably selected such that the rate of AR layer growth will be sufficiently slow that the resultant AR layer will be durable and uniform, such that the optical figure of the underlying substrate will not be significantly changed and such that the entire process will be reproducible and sufficiently controllable that the advantageous properties mentioned above can be achieved. By reproducibility, herein, is meant, for example, the achievement of the property of interest based on predictions founded on results of prior performances of the method, within ±2% or better.

In general, S/V will be selected so that the growth rate of the AR layer at the surface will be in the range of about 5–50 nm/hr, most typically in the range of 15–40 nm/hr. This range will vary from glass to glass and also from treatment solution to treatment solution. It also varies as a function of the desired property of interest. However, these ranges will at least be convenient starting points for any system; in most instances, rates within these ranges will achieve the desired properties. In any particular case, it is only necessary to perform a few routine preliminary experiments to determine a rate/time sufficiently slow to achieve satisfactory values of the properties of interest. In general, practically, the time for achievement of any AR surface of any λm will be a minimum of 12 hours and up to 90 hours. While shorter or longer times can be used, the results are often inferior from the standpoint of layer adhesion uniformity (e.g., cracks develop), durability, control etc.

In general, satisfactory S/V ratios will be in the working range of 1/1000 to 1/1 $cm^2/cm^3$, usually in the range of 0.05 to 0.4 $cm^2/cm^3$, most typically around 0.2 for most silicate glasses.

Because of the criticality of S/V, it is most important to make a judicious selection of the container holding the treatment solution. This must be completely inert under the processing conditions. Accordingly, glass containers are not suitable. (They would contribute to the surface area S in S/V.) Suitable containers include plastics such as polyethylene, polypropylene etc. and many others.

Accordingly, the most important preliminary experiment to perform in order to carry out the method of this invention is to routinely generate some parametric data based upon variations in S/V. Since, as described above, essentially all details of the process of this invention will have some influence on the precise results achieved, a basic system should first be selected for the given glass surface, e.g., system parameters will include chemical ingredients and their concentrations in the treating solution, its pH, treatment temperature, etc. The particular combination employed will not be critical for achieving the results of this invention but, to the extent possible and convenient, such details should be optimized for a given glass substrate, perhaps, using routine preliminary parametric experiments, the values being selected in accordance with the above discussion.

Once such a set of conditions is determined, a suitable S/V is selected in accordance with the above for operational control of the method of this invention. For example, in one convenient method, the sample is subjected to treatment in the solution for various specific time periods at a given S/V. Periodically, film growth is measured, e.g., by measurement of λm using conventional techniques. An extensive period will be found within which film growth is linear for each S/V chosen. At longer times, as further discussed below, film growth ceases, i.e., the glass surface/treatment solution combination reaches equilibrium. For example, for an S/V of about 0.2 $cm^2/cm^3$, film growth is linear up to about 90 hours. As can be seen from FIG. 5, for S/V varying from 0.023 to 0.081, the period of linearity of film growth varies from about 26 hours to about 35 hours. As will be shown below, the fact that the curves become nonlinear but asymptotic at some point is a distinct advantage.

In any event, within the linear range, a curve such as that shown in FIG. 4 can be constructed, i.e., a plot of $\lambda m$ versus time can be made. As long as S/V and the treatment solution are the same, any glass sample of a given composition can be treated for a period of time indicated on the graph to achieve the corresponding $\lambda m$ read off the linear plot. It is readily apparent that the construction of such a graph is very easy and provides a simple means for achieving the heretofore lacking reproducibility and control for applying AR surfaces onto silicate glasses. In the past, reproducibility could not be achieved even when the same glass composition and the same treatment solution were utilized since it was not known to maintain the S/V ratio constant. Even relatively minor changes in this parameter can produce highly significant changes in all properties of the resultant glass, including $\lambda m$.

Figure 5:
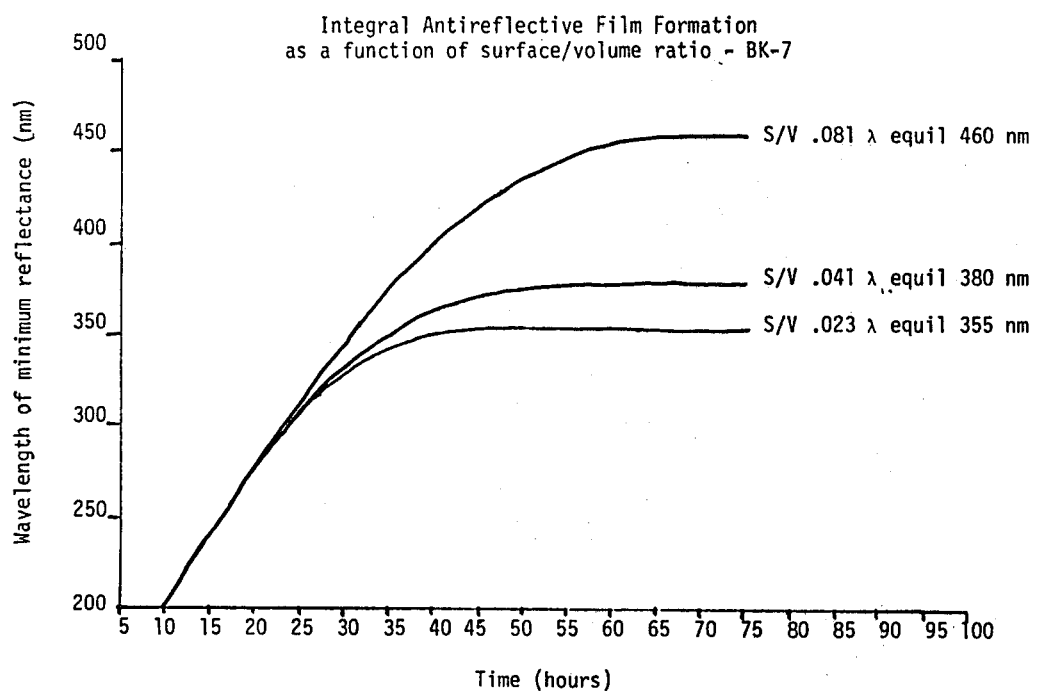
FIG. 5 shows integral antireflective film formation as a function of surface/volume ratio for BK-7 glass.

In another preferred procedure, advantage can be taken of the fact that the curves of $\lambda m$ versus time for a given S/V reach an asymptotic value. That is, for a given S/V, if the glass surface is allowed to remain in contact with the treatment solution for a sufficiently long period, $\lambda m$ will reach an equilibrium value and will not change. Film growth ceases once the glass and treatment solution reach a dynamic equilibrium. As a result of this phenomenon, parametric curves such as those of FIG. 5 can be constructed for any combination of treatment solution/glass composition. Such preliminary experiments will provide a minimum time at which the equilibrium film thickness (and $\lambda m$) will be achieved for a given S/V. In order to subsequently AR coat any surface of the same glass composition for minimum reflectance at the same $\lambda m$, it is only necessary to use the same treatment conditions and S/V and treat the surface for any time greater than this minimum time. For achievement of an AR surface of a different $\lambda m$ on the same glass composition, based on the parametric studies, one need only choose an appropriate S/V which will achieve the desired $\lambda m$. This method of control, as indicated in FIG. 5, has the advantage over the other possible methods in that the treatment time is not critical once the equilibrium condition has been achieved.

As can be seen, advantage can be taken of the accurate control provided by S/V by generating parametric curves in routine preliminary experiments such that any desired $\lambda m$ for any desired treatment solution/glass system can be readily obtained in a highly reproducible and predictable manner.

It has also been found that addition of $SiO_2$ to the treating solution has significant effects on AR layer growth. Thus, such additions can be used to vary $\lambda m$. The $SiO_2$ changes the rate of film growth in a given solution. In other words, addition of $SiO_2$ is another means of controlling film growth rate and causes effects as dramatic as variations in surface to volume ratio in many instances. In general, the $SiO_2$ addition is achieved by using reagent grade silicic acid. The amount added can be anywhere up to the solubility limit of silicic acid in water, e.g., typically in the range of 1–100 ppm. Its use is fully analogous to what has been described above. Corresponding parametric procedures can be employed to select a desired $\lambda m$ at a given time of treatment, S/V, solution composition etc.

In another aspect of this invention, it has been discovered that it is possible to remove the AR coatings from glass articles which have been coated in accordance with this invention. This is often desirable when the AR surfaces have been damaged or when it is desired to use the same optical element at a different wavelength for which it is also desired to have minimum reflectance. In addition, it has further been discovered that this same aspect of the invention can be used to pretreat optical components to be subsequently treated in accordance with this invention. Such a pretreatment eliminates the effects of different starting surface properties. For example, two optical elements identical except for polishing degrees, can be pretreated in accordance with this invention whereby their surfaces will be rendered identical for purposes of this invention. That is, after such a pretreatment, the subsequent AR coating per this invention will have the same characteristics in each case.

This is a major advantage of the process of this invention. Heretofore, with the conventionally applied coatings of heavy metal oxides, it was usually necessary to use corrosive acids such as HF to provide new surfaces for coatings. These seriously degrade the optical figure of the underlying optical element and affect the polished quality of the article. As a result, lengthy and expensive refiguring and/or polishing procedures were required.

It has been dicovered that this AR surface removal effect and pretreatment effect can be achieved by immersing the optical element in a solution identical to that defined herein for use in achieving AR coatings on silicate glasses except that the stabilizing polyvalent metal cation is eliminated. This provides a simple and reproducible technique for removing the existing surface from silicate glass articles as defined above without causing degradation of the original surface quality or figure. Subsequently, new antireflective surfaces can be generated in accordance with this invention. In the case of removal of a damaged AR surface, the reflection and transmission characteristics of the new AR surface will be the same as that of the original AR coating.

Without intending to limit the scope of this invention in any way, it is believed that the chemical basis underlying this aspect of the invention is a raising in the rate of hydrolysis of the porous surface layer while simultaneously holding the growth rate into the glass matrix constant. The lack of the polyvalent metal ions in the treating solution changes the equilibrium conditions of the system such that layer growth is negative whereby the layer on the article is removed.

The foregoing description of the AR coating process per se is fully applicable to this film removal aspect of the invention except for the presence of the polyvalent metal ions. Thus, optimum conditions and procedures can be determined parametrically as discussed above and in the Examples below. Again, the rate of removal is controlled by suitable selection of the various parameters. S/V is not as critical for film removal as it is for film application. For the latter, the method is not controllable or reproducible without control over S/V. For removal of an AR surface, on the other hand, one can operate without close control over S/V as long as the operative S/V is such that film removal is sufficiently slow to assure neglible spatial effects, e.g., upon dipping into or removal from solution.

A highly uniform, normally reflective surface is produced. Typical removal times are 24–48 hours in the S/V range discussed above.

For example, if BK-7 is originally treated using $3 \times 10^{-2}$ M $Na_2HPO_4$ and $1 \times 10^{-3}$ M $Al^{+3}$, the film produced may be removed using a solution of $3 \times 10^{-2}$ M $Na_2HPO_4$ and the same S/V. After removal, the surface may be retreated by a second immersion in the AR treatment solution which will give identical antireflective properties to the original AR surface. The entire process is repeatable and enables reapplication of AR surfaces to highly finished optical components without expensive refiguring.

In general, the pretreatment or removal features of this invention can be conducted using any aqueous solution defined above. However, it is preferred that the pretreatment be effected with the same aqueous solution, minus the polyvalent metal ion, as will be used in the subsequent AR coating treatment; correspondingly, for the removal feature of this invention, it is preferred that the aqueous solution be the same as that used to apply the original antireflection surface except containing none of the polyvalent metal ions. In the latter case, when a subsequent antireflection surface is to be applied, it is also preferred that this aqueous solution be the same as that used to apply the original surface.

Conducting the method of this invention is very simple and convenient. The glass samples are simply immersed in the treatment solution for a period of time sufficient to produce the desired reflectance minimum, the details of the method being preselected using the simple parametric procedures discussed above and exemplified below. The treated samples are then washed, typically with distilled or deionized water and dried using nonpolar liquids or commercial dewatering solvents. Subsequently, they are conventionally characterized and then used.

A particularly advantageous solution for general purposes has been found to comprise 0.1 M $Na_2HAsO_4$, or $Na_2HPO_4$ and 0.1 M $AlCl_3$. See Schroeder, supra. Such a solution is particularly useful for glasses containing substantial percentages of $Al_2O_3$ and alkaline earth elements such as Mg, Ca and Ba, i.e., soda-lime bottle or plate glass. For glasses of higher silica and boron oxide content, such as borosilicate optical glasses, a solution having lower reactant concentrations is preferred. A solution comprising $3 \times 10^{-2}$ M $Na_2HAsO_4$ or $Na_2HPO_4$ and $1 \times 10^{-3}$ M $AlCl_3$ has been found to be particularly suitable for such glasses, e.g., BK-7.

When a glass such as fused silica cannot be treated by the process of this invention, it can first be provided with a layer of a glass of a composition suitable for use with this invention, e.g., by simple deposition. This may be achieved by monolithic cladding techniques, gelatin from solution, plasma spray techniques or other such methods. Preferably after polishing the applied layer, antireflective surfaces may be produced on the silicate layer by this invention provided that the applied surface layer is at least $\lambda m/2$ thick.

Because the process of this invention relies on chemical reactions in aqueous solution to produce antireflective behavior, it is especially suitable for treatment of glass articles having a complex or convoluted shape which cannot be AR coated by vacuum deposition techniques. In principle, any glass surface in contact with the treatment solution will react to form an antireflective surface. Additionally, the relatively slow rate of reaction, giving typical treatment times of e.g., 18–50 hours, substantially reduces spatial effects on the reaction rate. Thus, the time required to produce a layer of approximately quarterwave optical thickness is 20 hr. Film formation is highly uniform over the entire surface area to be treated, allowing production of antireflective surfaces even on highly defined optical figures such as interferometric flats without change in the optical figure of the article. In principle, this effect is applicable even on articles of very large dimension which are difficult or impossible to treat by traditional vacuum deposition techniques since variations due to the finite time required to dip and withdraw the piece from solution will be negligible.

There is no inherent limitation to the size of an optical component which can be treated in accordance with this invention. Only the maximum size of the treating container would provide such a limitation at the upper end; at the lower end, the only limitation would involve the structural integrity of the optical component after the treatment. For example, extremely thin components might be incapable of maintaining the optical figure in part of their surfaces have been eroded in accordance with this invention.

As mentioned, the method of this invention is applicable to a wide range of silicate glasses. One of its most advantageous applications is to silicate optical components to be used in laser systems, most especially high energy laser systems. Components having antireflection surfaces in accordance with this invention have uniquely high thresholds to laser damage. In addition, the treatment process has negligible effect on the optical figure of the component per se. Accordingly, windows, lenses and other transmissive optical elements treated in accordance with this invention are especially important for laser applications. The nature of the laser system per se is not important since the wavelength of maximum transmission i.e., minimum reflectance can be varied at will using the techniques of this invention. Suitable such wavelengths vary from the ultra-violet range to the infrared range generally 200 nm to 3600 nm, typically 250 nm to 2500 nm. However, a minimum reflectance wavelength outside these ranges can be achieved should the need arise, e.g., to longer IR wavelengths for solar collector applications.

Due to the particularly high durability of the optical components prepared in accordance with this invention, they have a very high threshold of laser damage on the order of tens of joules per $cm^2$. This is significantly higher than the thresholds for conventionally applied antireflective coatings. Accordingly, high energy lasers using optical components treated in accordance with this invention will have properties superior to those operating otherwise. It is particularly advantageous for the amplifier tube of the laser system to be treated in accordance with this invention so that its sides or end windows (e.g., on a Brewster tube), as necessary, become antireflective.

An additional consequence of the nature and structure of antireflective surface layers produced by this process is that the surface layer is integral to the article, giving an extremely high adhesion strength. This is a result of the lack of a discrete boundary between the leached layer and the substrate and because the connective bands are those of the glass matrix itself. This is also true of antireflective layers produced by polymerization of silicates onto a glass substrate. However, the process of this invention has additional structural advantages over such gel-deposited layers because it does not involve application of a discrete layer. Thus, there is no chance of having contaminant deposits present at the layer-substrate boundary.

The latter property offers certain distinct advantages for antireflective surfaces prepared for use in high energy laser systems. This is highly surprising because of the prior art prejudice that subtractive layers produced by neutral solutions and other etch/leach processes had poor properties. It would have been expected that the resultant surfaces would be especially inapplicable to laser applications particularly those involving high energy with its concomitant high demands.

Prior art AR surfaces have been found to exhibit significant damage effects when exposed to high power laser radiation in short pulses due to vaporization of trapped contaminants, resulting in rupture of the antireflective coating. Because of the non-existence of a coating-substrate boundary, such effects do not occur in the surface layers prepared by the process of this invention. For example, the threshold of laser damage for 1.064 $\mu$m laser light (e.g., Nd glass or Nd Yag) at a 1.0 nsec pulse length for conventional applied coatings (e.g., multilayer, dielectric thin films) is typically 5 j/cm$^2$ and usually limits a laser's output power and energy. The threshold of laser damage for surfaces prepared by this process has been measured to be 12–15 j/cm$^2$ for example, a significant and important increase. This allows substantially increased laser power levels to be used in an optical system without adverse effects. As a result, using this invention, production of damage resistant coatings is possible without special facilities such as clean rooms for control of particulate contamination. Using the process of this invention, reflectance values R at $\lambda$m of 0.05 to 1% can be obtained, depending on the particular type of glass. For optimal conditions, R is typically 0.05 to 0.2 at $\lambda$m.

This invention provides AR surfaces useful for optical components of any high energy laser system (e.g., in the megawatt or gigawatt ranges) lasing at a wavelength at which silicate glass is sufficiently transparent.

Without intending to limit this invention in any way, it is believed that the chemical basis of this process is selective attack of the glass structure by hydroxyl ions. By adjustment of hydroxyl ion concentration, differences in the rate of hydrolysis of the silicate glass network due to the presence or absence of certain glass constituents may be heightened. Specifically, the rate of nucleophilic attack of alkali rich sites within the glass structure is significantly faster than at sites consisting only of tetrahedrally-linked SiO$_2$. At low hydroxyl ion concentrations (i.e., in the pH range of about 7.0–8.0), this rate difference results in formation of a porous, silica-rich layer. When stabilized by addition of polyvalent metal ions provided by the solution, this results in a stable porous film of low refractive index. Under the proper chemical conditions, such films will grow to a constant equilibrium thickness controlled by the rate of hydrolysis of the porous film and by the growth rate of the film into the glass which, in turn, is controlled by the diffusion of reactive species through the porous layer. Diffusion of reactive species into the film results in a gradient in the porosity of the film and thus in its refractive index. This gradient is believed to be the basis for the observed differences in optical behavior between surfaces produced by this process and the behavior expected from a uniform layer of material of the same refractive index. The following is an illustrative sample of this difference, and is presented for purposes of clarification and is not intended to limit this invention in any way.

Consider the case of a single discrete layer on a glass substrate. See FIG. 1. The top medium, characterized by $n_o$, is air. The Fresnel reflection coefficients for the air/film interface are defined by $$r_{1\perp} = \left[ \frac{\sin(\phi_{1i} - \phi_{1r})}{\sin(\phi_{1i} + \phi_{1r})} \right] \text{ perpendicular component} \quad (1)$$

$$r_{1\parallel} = \left[ \frac{\tan(\phi_{1i} - \phi_{1r})}{\tan(\phi_{1i} + \phi_{1r})} \right] \text{ parallel component}$$

The film is characterized by $n_1$ and the substrate by $n_2$. The Fresnel reflection coefficients for the film/substrate interface are defined by $$r_{2\perp} = \left[ \frac{\sin(\phi_{2i} - \phi_{2r})}{\sin(\phi_{2i} + \phi_{2r})} \right] \text{ perpendicular component} \quad (2)$$

$$r_{2\parallel} = \left[ \frac{\tan(\phi_{2i} - \phi_{2r})}{\tan(\phi_{2i} + \phi_{2r})} \right] \text{ parallel component}$$

Application of Snell's law leads to a relation between $\phi_i$, the angle of incidence, and $\phi_r$, the angle of refraction. At interface #1

$$\phi_{1r} = \operatorname{Sin}^{-1}\left[ \frac{n_o \sin \phi_{1i}}{n_1} \right] \quad (3)$$

By geometry $$\phi_{1r} = \phi_{2i} \quad (4)$$

and making use of Snell's Law at the interface #2, $$\phi_{2r} = \sin^{-1}\left[ \frac{n_1 \sin \phi_{2i}}{n_2} \right] \quad (5)$$

For this discussion, the angle of incidence at interface #1, $\phi_i$, is taken as 10° and the index $n_o$ is taken equal to that of air, i.e., $n_o = 1.000$. As an example, the index of the substrate will be that of the borosilicate glass BK-7, i.e., $n_2 = 1.489$. Using these values, one obtains for equations 3, and 5

$$\phi_{1r} = \sin^{-1}\left[ \frac{0.1736}{n_1} \right] \quad (3b)$$

and $$\phi_{2r} = \sin^{-1}\left[ \frac{n_1 \sin \phi_{1r}}{1.489} \right] \quad (5a)$$

The reflectance, R, from the surface is given by $$R = \frac{r_1^2 + 2r_1 r_2 \cos 2\delta_1 + r_2^2}{1 + 2r_1 r_2 \cos 2\delta_1 + r_1^2 r_2^2}, \quad (6)$$

where R is either $R\perp$ or $R\parallel$ and $r_1$ and $r_2$ are, then, the perpendicular or parallel Fresnel reflection coefficients respectively. The phase, $\delta_1$ is given by $$\delta_1 = \frac{2\pi n_1 T_1 \cos\phi_{1r}}{\lambda} \qquad (7)$$

The thickness of the film is given by $T_1 \cos \phi_{1r}$ and $\lambda$ is the wavelength of interest. If unpolarized light is used in the reflectance measurements, the value which is actually measured is $$\overline{R} = \frac{R_\perp + R_\parallel}{2} \qquad (8)$$

In the case of an ideal quarter wavelength film, R has a minimum value of zero for $n_1 = n_2$ and $\delta_1 = \pi/2$ at the wavelength, $\lambda m$, associated with the position of the minimum. For this case, $r_1 = r_2$ and $\overline{R} = 0$. For the case where $\delta_1 = \pi/2$ at $\lambda n$, however, $r_1 = r_2$; then, $$R = \frac{(r_1 - r_2)^2}{(1 - r_1 r_2)^2}$$

Assuming normal incidence $$r_{1\perp} = r_{1\parallel} = r_1 = \left[\frac{n_1 - 1}{n_1 + 1}\right] \text{ and}$$

$$r_{2\perp} = r_{2\parallel} = r_2 = \left[\frac{n_2 - n_1}{n_2 + n_1}\right]$$

Thus, the reflectance is given by the classical equation $$R = \left[\frac{n_1^2 - n_2}{n_1^2 + n_2}\right]^2 \qquad (9)$$

Figure 2:
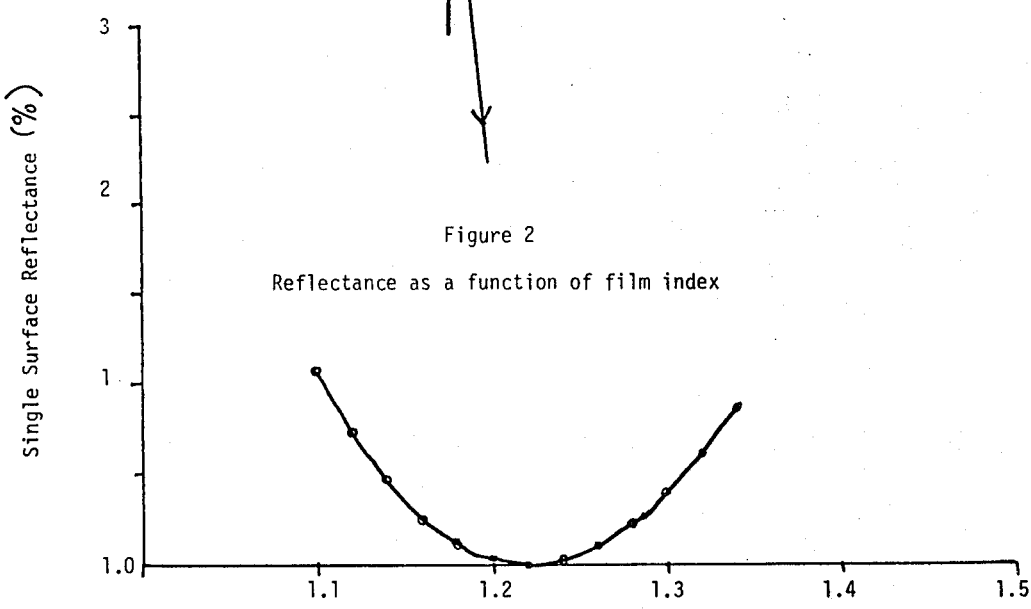
FIG. 2 depicts reflectance as a function of film index.

Equation (9) is plotted in FIG. 2. The experimentally measured value of the reflectance minimum for BK-7 is 0.0010 at $\lambda m = 540$ nm (See FIG. 3). As shown in FIG. 2, this value of reflectance can be obtained, for fixed value of $\delta 1$, at $n_1 = 1.182$ or $n_1 = 1.260$.

Consider the case where $n_1 = 1.182$ and $\delta_1 (\lambda m) = \pi/2$. The appropriate values of $T_1$, $\phi_{1i}$, $\phi_{1r}$, $\phi_{2i}$, $\phi_{2r}$, and $\delta_1$, and the Fresnel reflection coefficients are listed in Table 1.

TABLE I

Values of $T_1$, $\phi_{1i}$, $\phi_{1r}$, $\phi_{2i}$, $\phi_{2r}$, $\delta_1$ ($\lambda m$) and the Fresnel reflection coefficients for $n_1 = 1.182$.

| | |
|---|---|
| $n_o = n = 1.000$ | |
| $n_1 = 1.182$ | |
| $n_2 = n_{BK-7} = 1.489$ | |
| $T_1 = 115.47$ nm | $r_{1\perp} = 0.08571$ |
| $\phi_{1i} = 10.000°$ | $r_{1\parallel} = 0.08134$ |
| $\phi_{1r} = 8.446°$ | |
| $\phi_{2i} = 8.446°$ | $r_{2\perp} = 0.1170$ |
| $\phi_{2r} = 6.695°$ | $r_{2\parallel} = 0.1130$ |
| $\delta_1 (\lambda m) = \pi/2$ | |
| $\delta_1 (\lambda) = \frac{848.23}{\lambda}$ | |

The theoretical curve for the reflectance as a function of wavelength for a discrete quarter wave layer is shown in FIG. 3—solid line. Also, in FIG. 3 are the data points measured for a typical sample (circles) (S/V=0.204).

The following observations can be made.

(1) For wavelengths shorter than or longer than $\lambda m$, the data points fall below the theoretical curve for a discrete quarter wave layer. For $\lambda < \lambda m$, the difference between the theoretical curve and the data points increases rapidly as the wavelength decreases. For $\lambda < \lambda m$, the data points run almost parallel to the theoretical curve.

(2) In the neighborhood of $\lambda m$ the data points and the theoretical curve are coincident.

As shown, the coating of this invention for $\lambda < \lambda m$ or $\lambda < \lambda m$ outperforms a discrete quarter wave layer. In the neighborhood of $\lambda m$ the performance is the same for both types of coatings.

This invention can be used as described hereinabove in conjunction with any type or configuration of a substrate having a silicate glass surface. It is especially applicable to optical elements such as lenses and windows useful in the wavelength ranges mentioned above for use of this invention, e.g., in the UV, visible or IR ranges of the spectrum. Fields of use include lasers, photography, optical communications, and the like where precision control over the optical characteristics of the element is important.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A group of polished samples of the optical borosilicate glass BK-7 was cleaned using vapor degreasing techniques and immersed in an aqueous solution of $3 \times 10^{-2}$ M $Na_2HAsO_4$ and $1 \times 10^{-3}$ M $AlCl_3$. Treatment temperature was 87° C. Samples were taken at timed intervals for periods of 12 to 48 hours giving antireflective surfaces with reflectance minima of increasing wavelength with increasing time. A summary of the wavelength of minimum reflectance, the two surface reflectance at the minimum, transmittance at the minimum and the process time is given in Table 2. The wavelength of minimum reflectance varied linearly as a function of time as shown in FIG. 4. The bandwidth of single surface reflectance below 1.0 percent is relatively large as shown by the following data for samples of BK-7 processed under the described conditions. (S/V=0.204)

Figure 6:
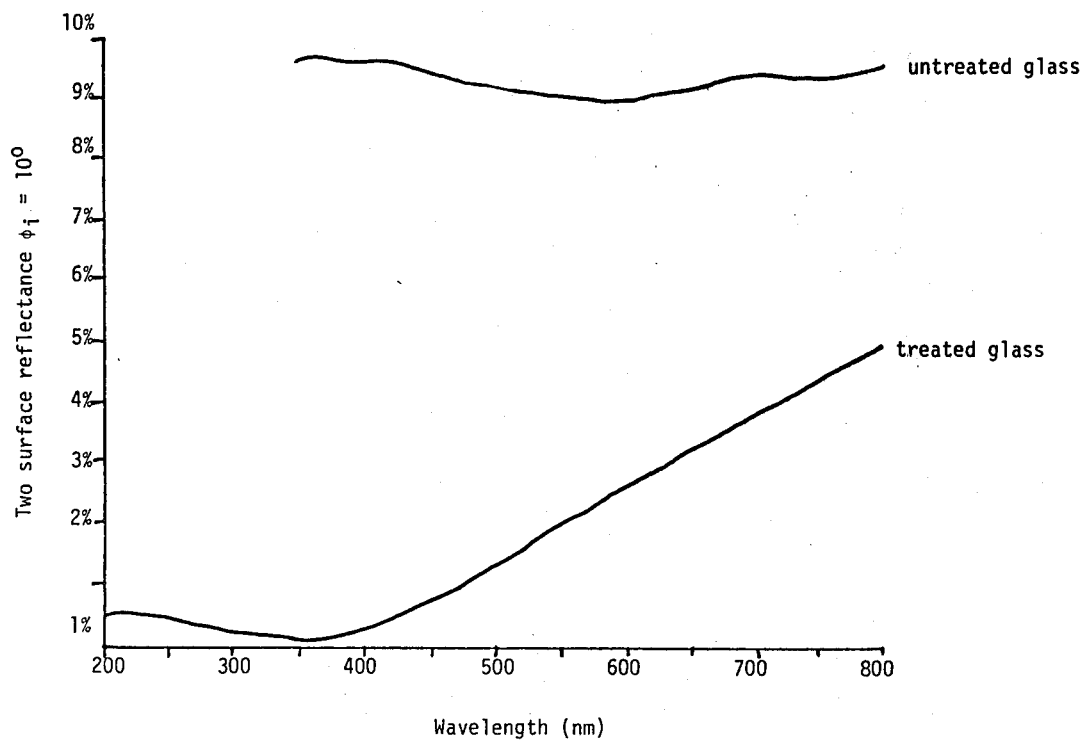

(a) Short wavelength minimum, $\lambda min. = 375$ nm (FIG. 6)
  % R at minimum=0.1% per surface
  bandwidth of $\leq 1.0\%$ single surface reflectance=260 nm
  bandwidth of $\leq 0.25\%$ single surface reflectance=115 nm (b) Optimized for visible spectrum, $\lambda min.$ 595 nm (FIG. 7)
  % R at minimum=0.08% per surface
  bandwidth of $\leq 1.0\%$ single surface reflectance=475 nm
  bandwidth of $\leq 0.25\%$ single surface reflectance=128 nm (c) Optimized for Nd glass laser output (1060 nm)

(FIG. 8)
λmin. = 1060 nm
% R at minimum 0.11% per surface
bandwidth of ≦1.0% single surface reflectance = 750 nm
bandwidth of ≦0.25% single surface reflectance = 260 nm

EXAMPLE 2

As an example of the process of utilizing the equilibrium state of the reaction process to control the reflectance spectrum and the wavelength of minimum reflectance, a series of groups of polished BK-7 samples were cleaned and processed as described in Example 1. The sole difference is that the ratio of surface area to solution volume was varied in the various cases. FIG. 5 is a plot of the wavelength of minimum reflectance as a function of processing time for a number of differing S/V ratios. As can be seen, reduction in the S/V ratio will reduce the wavelength of minimum reflectance at the steady state condition. Antireflective properties of glass samples prepared in this manner are identical to samples produced by the method described in Example 1 provided that the wavelength of minimum reflectance is the same.

TABLE 2

| | Optical Characteristics of Integral Antireflective Surfaces on BK-7 | | |
|---|---|---|---|
| Sampling Time (hr.) | Wavelength of Minimum Reflectance | % Reflectance at the Minimum | % T at Minimum |
| 4 | no single minimum | 8% R 530 nm | 91.8% T 530 nm |
| 6 | no single minimum | 6.8% R 530 nm | 93.0% T 530 nm |
| 10 | 270 nm | 0.01% | N.A. |
| 14 | 448 nm | 0.05% | 99.5% |
| 17 | 510 nm | 0.05% | 99.8% |
| 18 | 525 nm | 0.05% | 99.8% |
| 20 | 565 nm | 0.10% | 99.7% |
| 24 | 660 nm | 0.10% | 99.7% |
| 26 | 710 nm | 0.10% | 99.8% |
| 28 | 738 nm | 0.10% | 99.7% |
| 34 | 895 nm, 358 nm | 0.30%, 0.25% | 99.5%, 92% |
| 36 | 960 nm, 365 nm | 0.20%, 0.3% | 99.6%, 91% |
| 38 | 1000 nm, 390 nm | 0.20%, 0.15% | 99.0%, 91% |
| 39 | 1040 nm, 370 nm | 0.01%, 0.10% | 99.3% |
| 45 | 1400 nm, 550 nm | 0.2%, 0.21% | 99.5%, 99.5% |

Reflectance and transmittance data for two surfaces $\phi_I = 10°$

EXAMPLE 3

Figure 9:
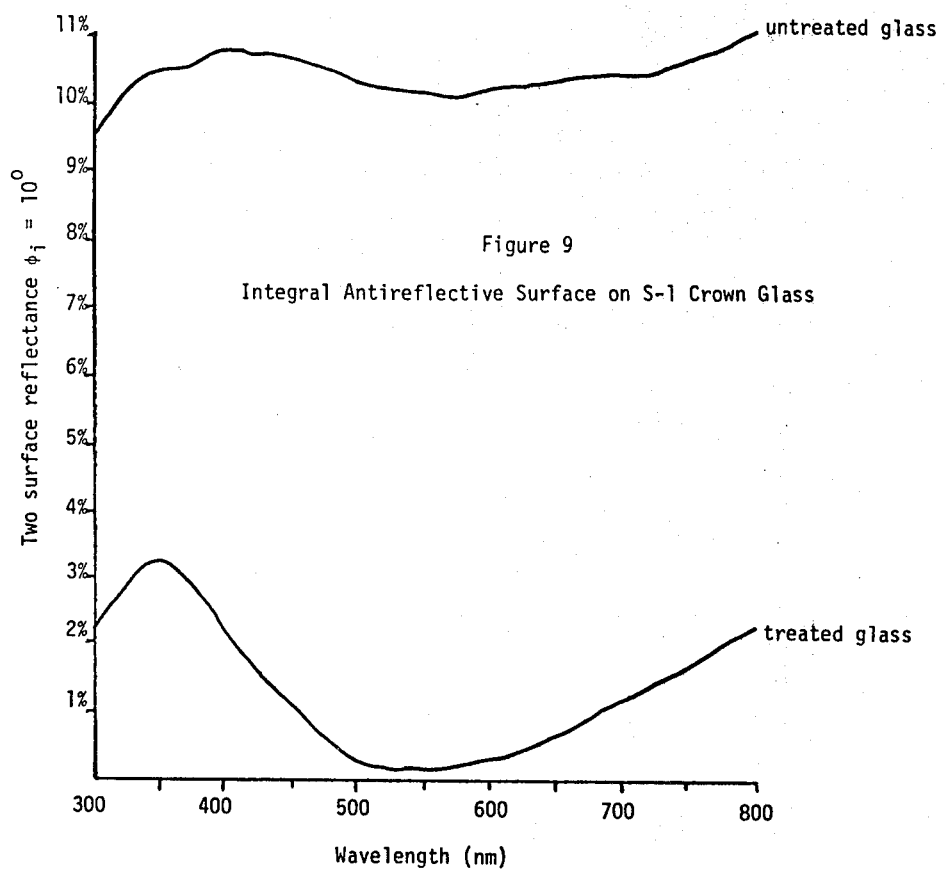

A group of polished samples of S-1 ophthalmic crown glass was cleaned using vapor degreasing techniques and immersed in an aqueous solution of $3 \times 10^{-2}$ M $Na_2HAsO_4$ and $1 \times 10^{-3}$ M $AlCl_3$ at 87° C. for varying lengths of time. Antireflective surfaces were produced with the wavelength of minimum reflectance varying linearly as a function of time in the period 0–48 hours. The following data were obtained from a group of samples prepared for optimum performance in the visible range as would be required for ophthalmic lenses and CRT screens. The reflectance spectrum is shown in FIG. 9 and compared to that of normal polished S-1 glass. (S/V = 0.204)
λmin. = 545 nm
% R at minimum 0.11% per surface
bandwidth below 1.0% single surface reflection 410 nm–775 nm = 365 nm
bandwidth below 0.25% single surface reflection 488 nm–620 nm = 132 nm

EXAMPLE 4

Figure 10:
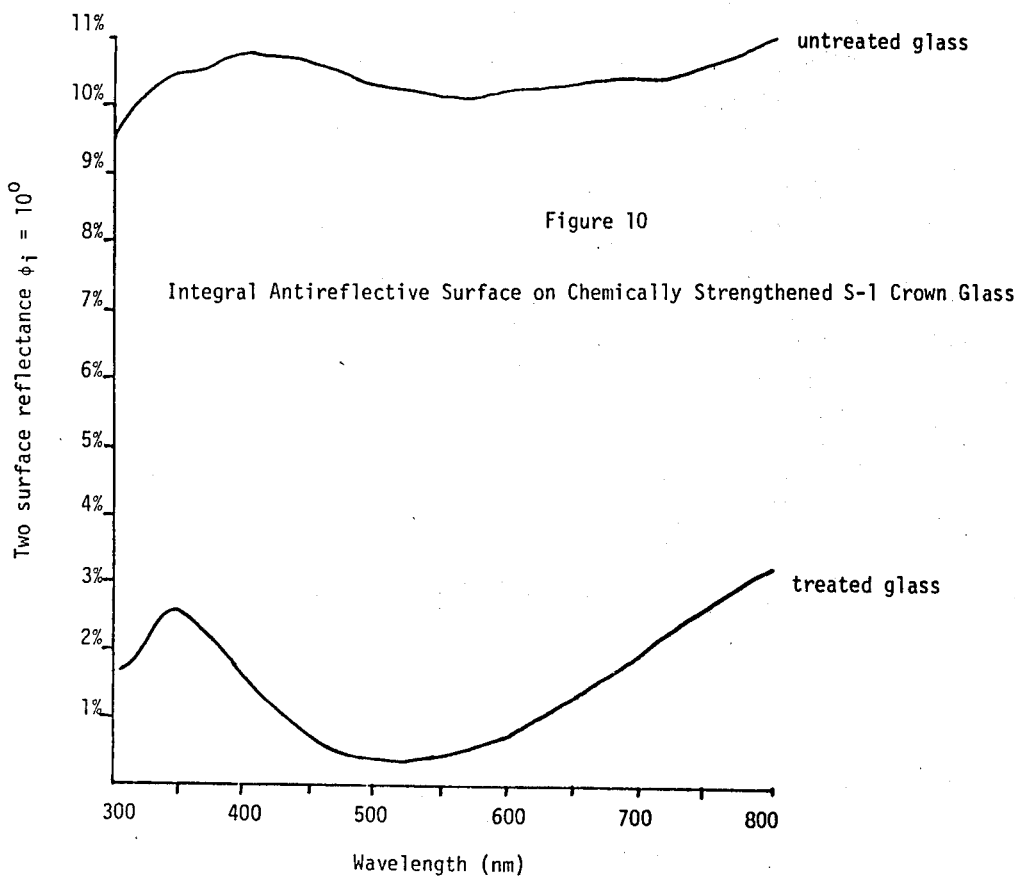
Figure 16:
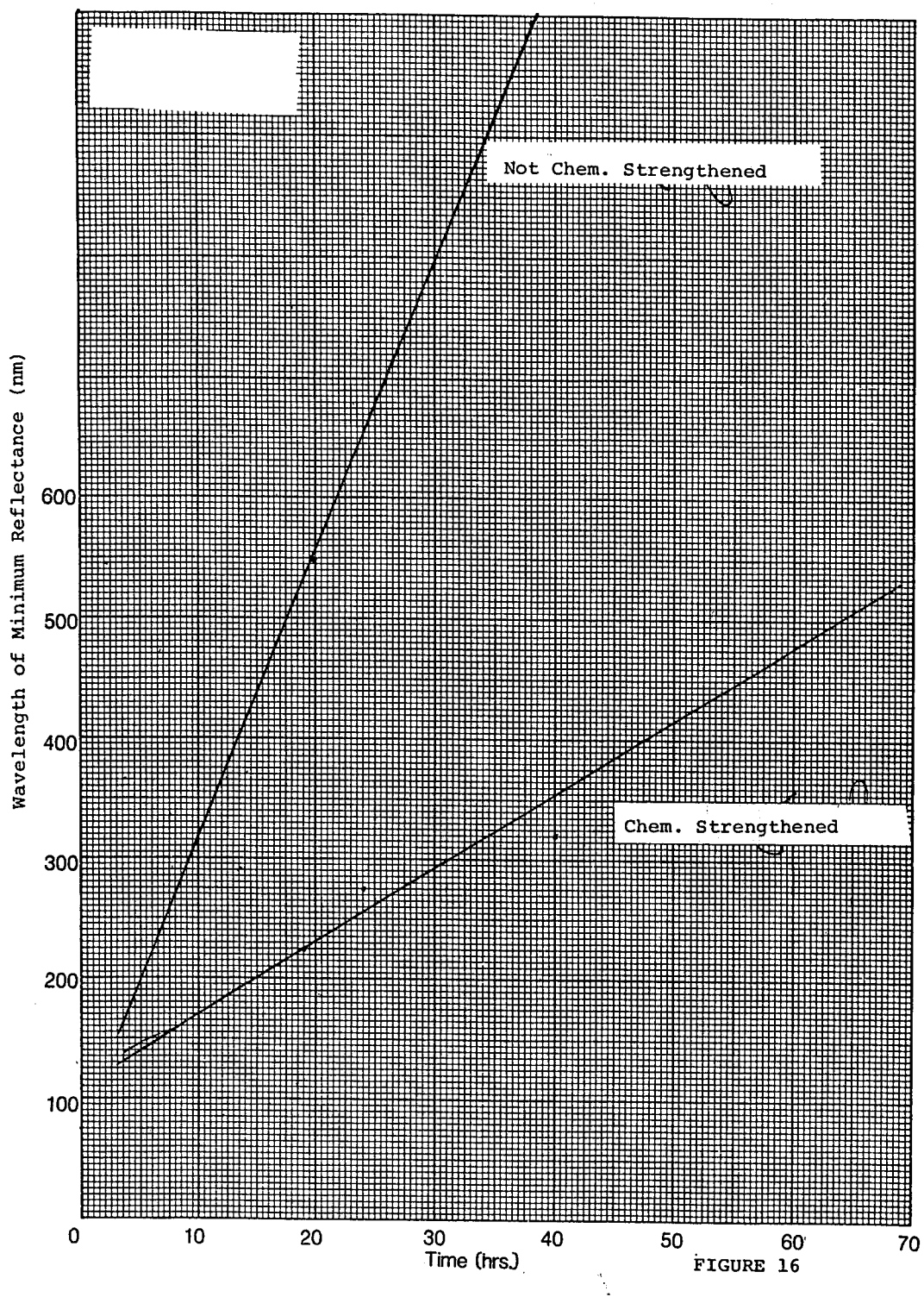
FIGS. 16-18 show the variation of $\lambda m$ vs time for several glass systems at a given S/V.

Another set of S-1 crown glasses which had been chemically strengthened in a molten $KNO_3$ bath for 18 hours at 480° C. was cleaned and treated using conditions described in Example 3. A surface compression of 15,000 psi was obtained. The reflectance spectrum of untreated and treated glass is given in FIG. 10.
λmin. = 510 nm
% R at minimum = 0.16% per surface
bandwidth below 1.0% per surface 352 nm–705 nm = 352 nm bandwidth
bandwidth below 0.25% per surface 465 nm–562 nm = 97 nm bandwidth Surface compression was retained after treatment.
FIG. 16 shows the variation of λm vs time for the two glass systems of Examples 3 (non-strengthened) and 4.

EXAMPLE 5

Figure 11:
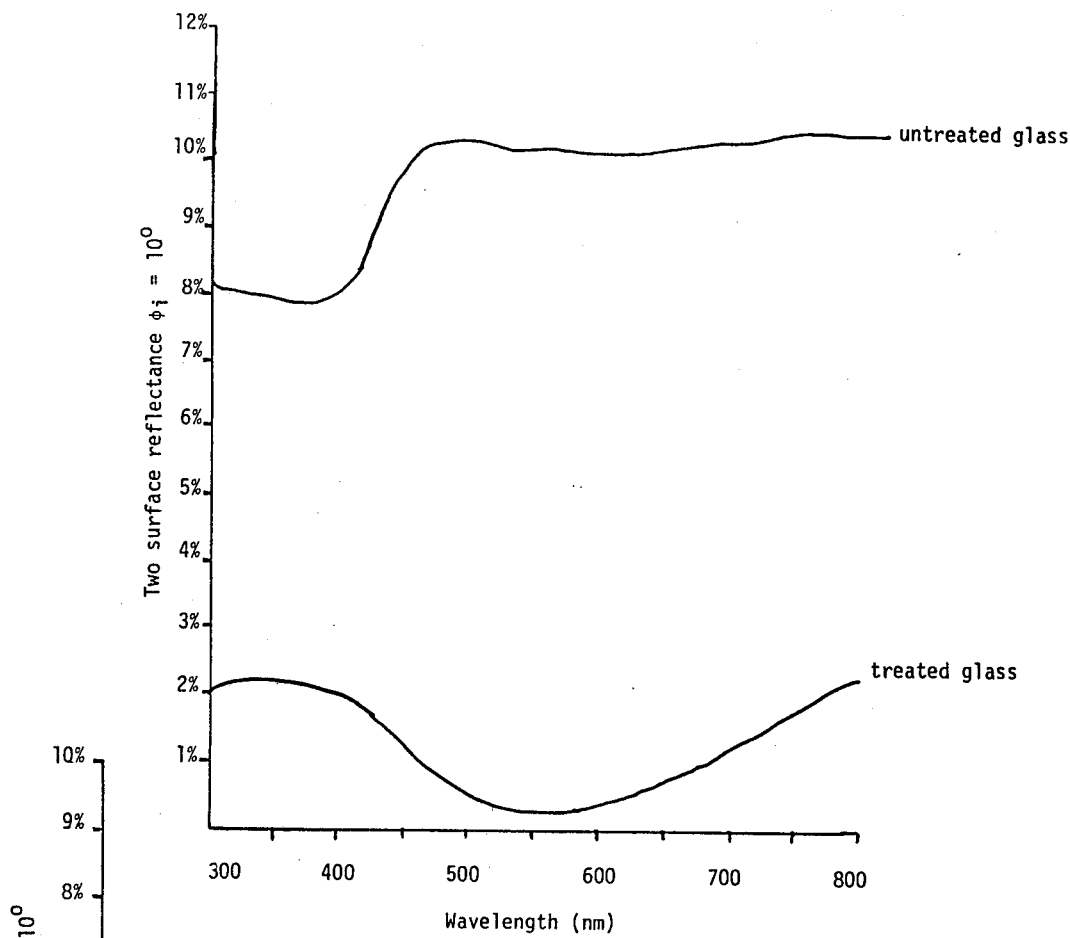
Figure 17:
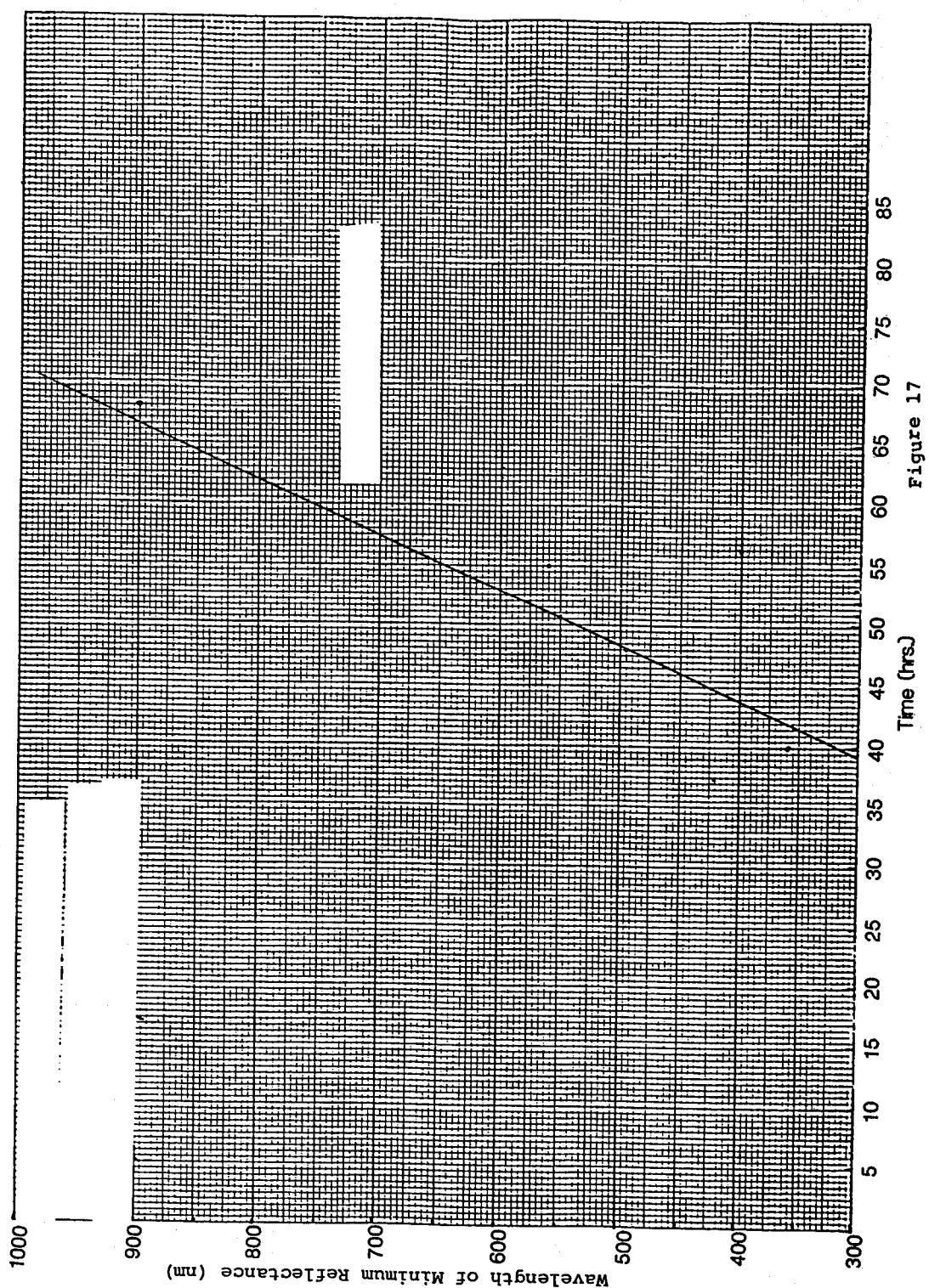

A group of polished samples of S-8100 UV Haze Photofilter glass was cleaned and treated in an aqueous solution of $3 \times 10^{-2}$ M $Na_2HAsO_4$ and $1 \times 10^{-3}$ M $AlCl_3$ at 87° C. for varying lengths of time. Antireflective surfaces were produced with the wavelength of minimum reflectance varying linearly as a function of time. The following data were obtained from a second group of samples prepared using processing time calculated to provide optimal antireflective behavior in the visible region. A reflectance spectrum of an untreated and treated sample is given in FIG. 11. (S/V = 0.112)
λmin. = 555 nm
% R at minimum = 0.17% per surface
bandwidth below 1.0% per surface 350 nm–785 nm = 435 nm
bandwidth below 0.25% per surface 520 nm–620 nm = 100 nm FIG. 17 shows the variation of λm vs time for this glass system at the same S/V.

EXAMPLE 6

Figure 12:
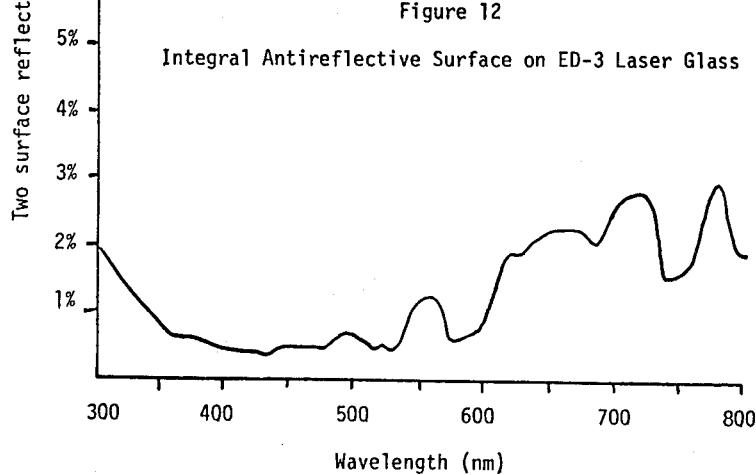

A group of polished samples of the silicate laser glass ED-3 were cleaned and treated in an aqueous solution of $3 \times 10^{-2}$ M $Na_2HAsO_4$ and $3 \times 10^{-4}$ M $AlCl_3$ at 87° C. for varying lengths of time. (S/V = 0.204) Again, antireflective surfaces were produced with the wavelength of minimum reflectance varying linearly with time. In this case, the high $Al_2O_3$ content of the glass strongly reduced the rate of film formation, and relatively long processing times were required. A reflectance curve of a sample having a reflectance minima of 450 nm is given in FIG. 12. For practical utility in a working laser, such a glass should have a reflectance minimum at the output wavelength of 1060 nm. Laser amplifier rods may also be treated in the same manner.

Figure 18:
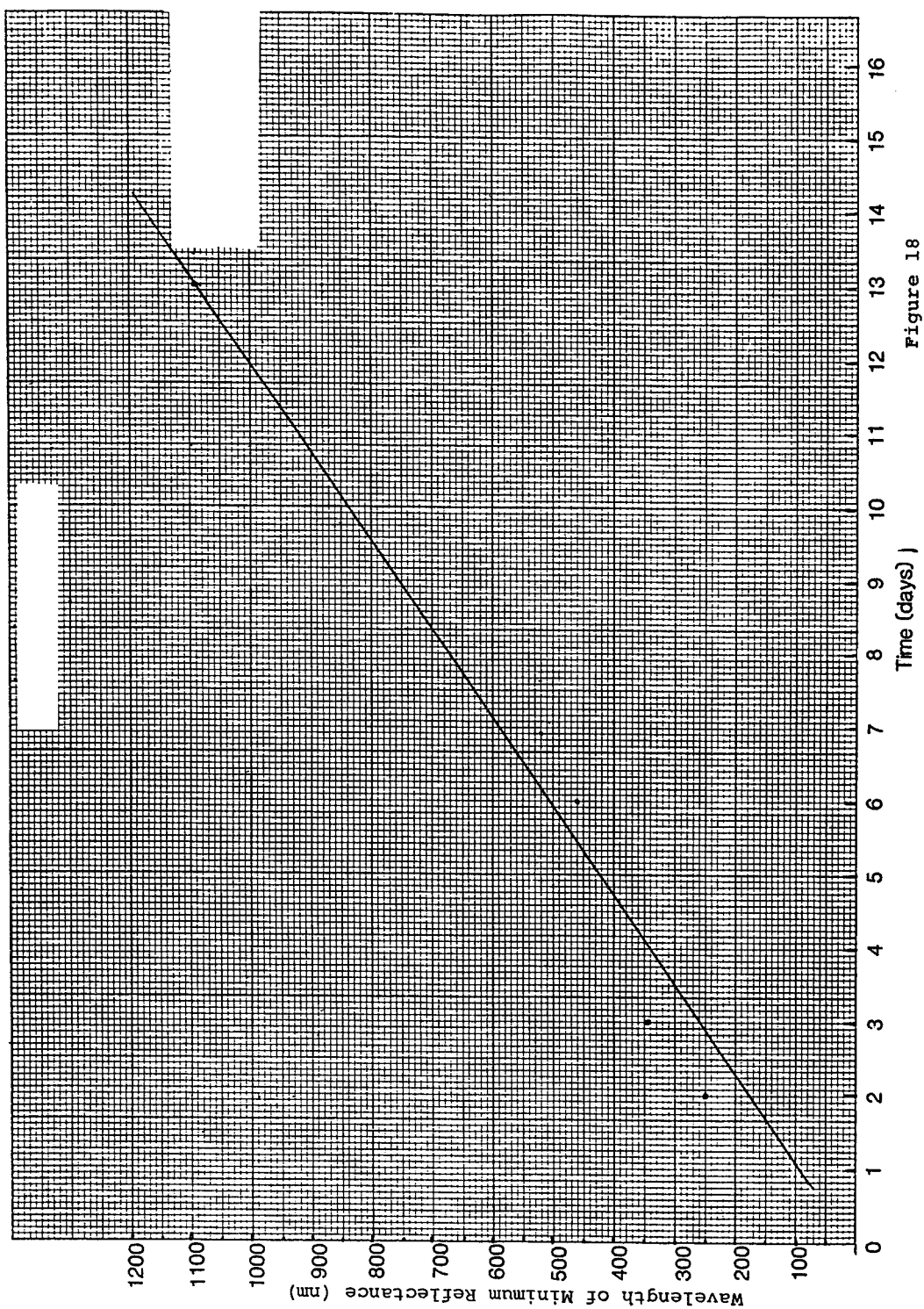

FIG. 18 shows the variation of $\lambda m$ vs time for this glass system.

EXAMPLE 7

Figure 13:
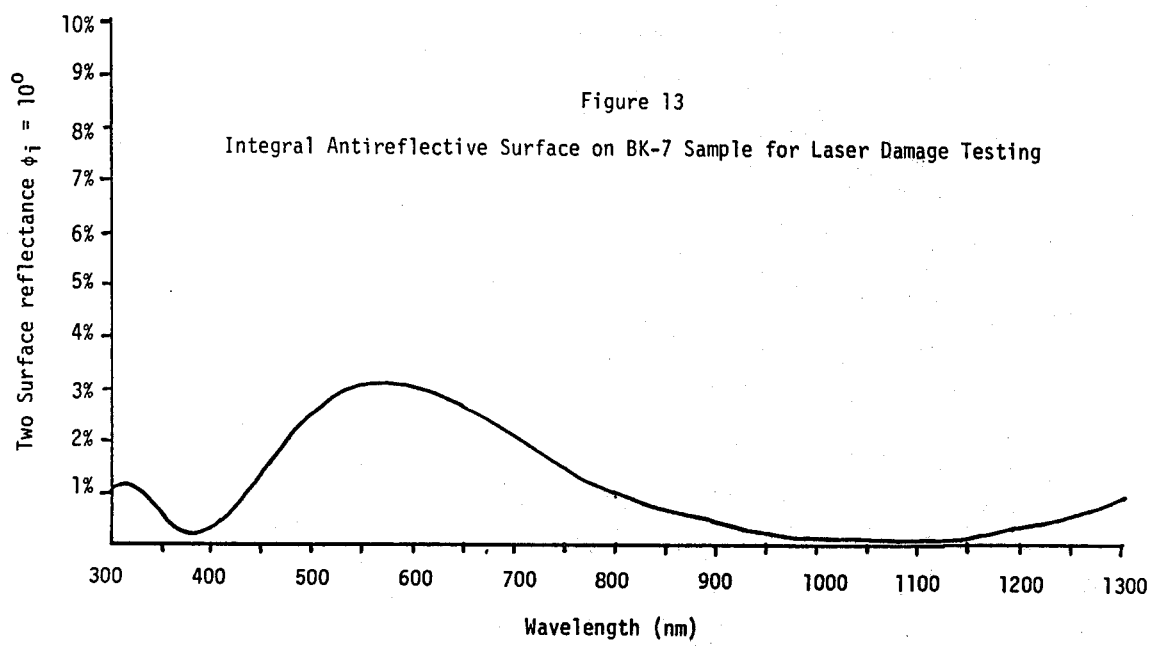

A group of ten samples of polished BK-7 borosilicate glass was processed using the method described in Example 1 to give minimum reflectance at 1060 nm. The reflectance spectrum of the samples is given in FIG. 13. The samples were then tested for laser damage resistance using 1 nanosecond pulses of 1060 nm laser light at varying power levels. The following results were obtained for the sample group.

| Sample Preparation | Front Surface Damage | Rear Surface Damage |
|---|---|---|
| As produced | $15.7 \pm 1.6$ j/cm$^2$ | $10.2 \pm 1.0$ j/cm$^2$ |
| As produced | $15.3 \pm 1.5$ j/cm$^2$ | $13.3 \pm 1.3$ j/cm$^2$ |
| Cleaned with alcohol | $15.6 \pm 1.6$ j/cm$^2$ | $12.4 \pm 1.8$ j/cm$^2$ |
| Evacuated to 10 $\mu$m Hg pressure 16 hours, then exposure to 7 j/cm$^2$ laser beam | $23.3 \pm 2.3$ j/cm$^2$ | $18.2 \pm 1.8$ j/cm$^2$ |
| Evacuated to 10 $\mu$m Hg pressure 16 hours | $17.4 \pm 1.7$ j/cm$^2$ | $12.6 \pm 1.3$ j/cm$^2$ |

This may be compared to the damage levels of normal vacuum deposited coatings for the same pulse length which are 3–5 j/cm$^2$.

EXAMPLE 8

Figure 14:
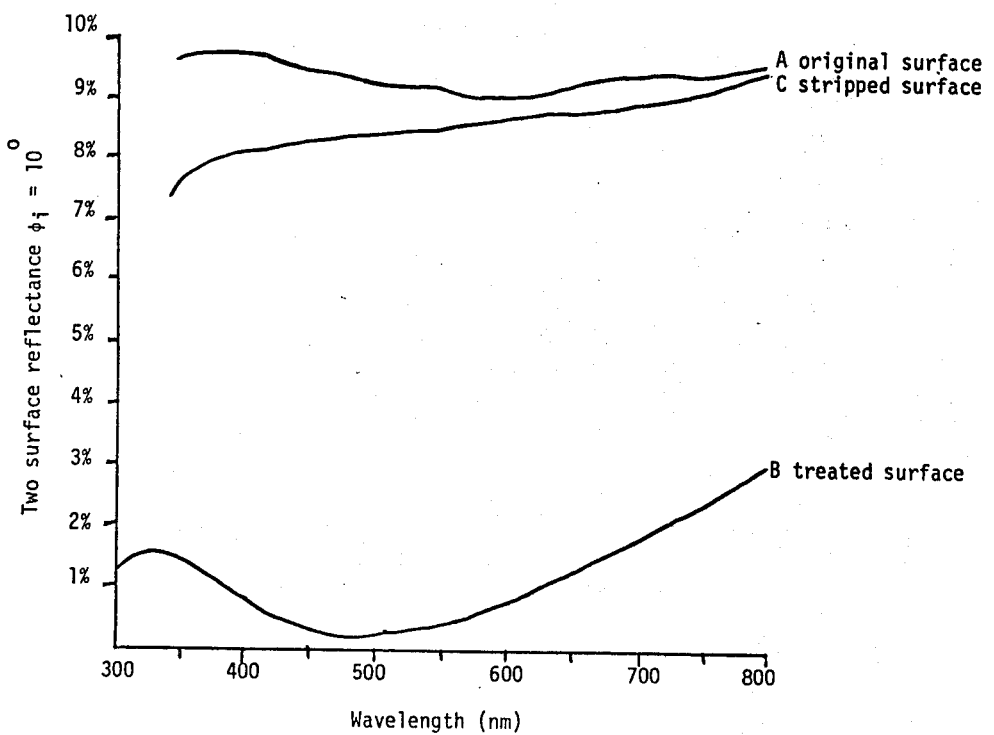
FIG. 14 shows the results of AR film removal according to the invention.
Figure 15:
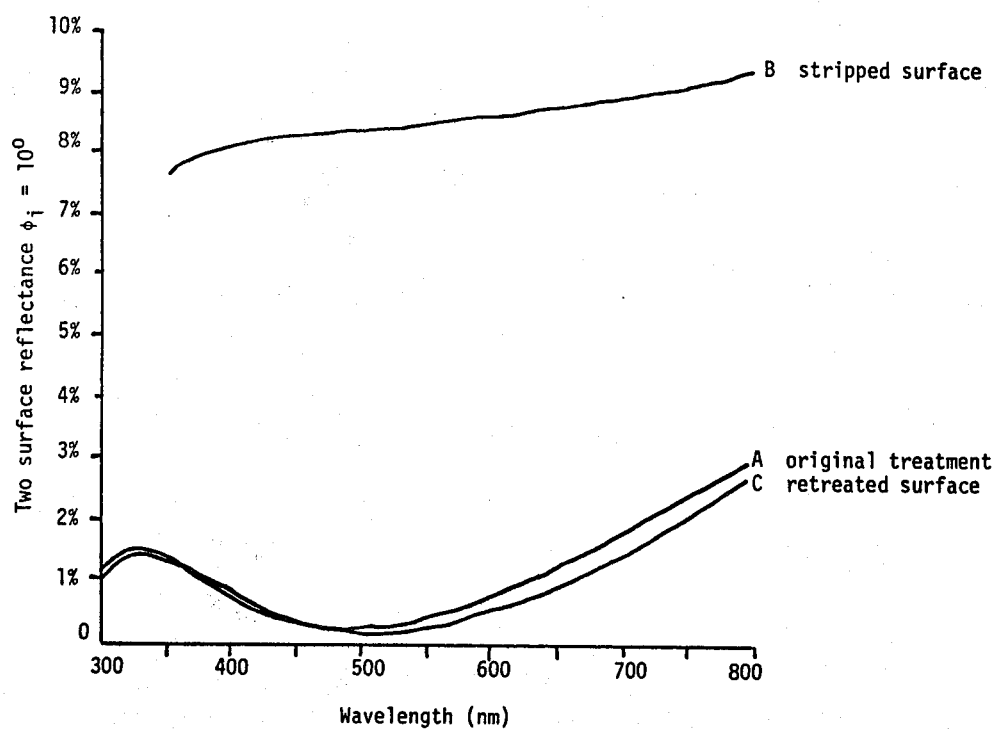
FIG. 15 shows the results of a reapplication of an AR surface on a stripped surface.

A group of 15 samples of polished BK-7 borosilicate glass was processed using the method described in Example 1 to give minimum reflectance at 500 nm. The samples were then stripped by immersing them in a bath of $3 \times 10^{-2}$ M Na$_2$HAsO$_4$ at 87° C. for 48 hours. FIG. 14 shows the reflectance spectrum before treatment and after stripping. As can be seen, essentially normal bare surface reflectance values are restored. The samples were then re-treated using the procedure described in Example 1 to give antireflective surfaces optimized at 500 nm. A comparision of reflectance spectra of the original and regenerated surfaces is given in FIG. 15. No visible alteration or degradation in surface quality was observed.

EXAMPLE 9

A sample of BK-7 which had been polished to interferometric flatness was treated using the methods described in Example 1 to give reflectance minima at 1060 nm. Interferograms were taken before and after treatment. No detectable alteration in the optical figure of the surface could be detected.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method of preparing an antireflective surface on a silicate glass surface of a particular silicate glass composition containing at least 5 weight % of alkali metal, comprising treating the silicate surface with an aqueous solution of pH 7.0–8.5 which contains an electrolyte with a dissociation constant at 20° C. greater than $10^{-6}$ and which contains a polyvalent cation, the improvement comprising
    conducting the treatment step with a ratio of the area of said silicate glass surface to the volume of said aqueous treating solution such that the resultant antireflective surface is substantially uniform and has a predetermined wavelength range of minimum reflectance, and, in order to achieve said predetermined wavelength range, adjusting the duration of the treatment step in accordance with a premeasured dependence, for said particular silicate glass composition, of wavelength of minimum reflectance as a function of said ratio and duration of treatment.

2. A method of claim 1, wherein said ratio is in the range of 1/1000 to 1/1 cm$^2$/cm$^3$.

3. A method of claim 2, wherein said ratio is in the range of 0.05 to 0.4 cm$^2$/cm$^3$.

4. A method of claim 1, which comprises preparing antireflective surfaces on multiple silicate surfaces of the same composition and adjusting the duration of treatment to reproducibly achieve essentially the same optical properties for each surface at a predetermined minimum wavelength range for each surface.

5. A method of claim 1, wherein the concentration of the polyvalent cation is in the range from the concentration of the electrolyte down to 1000 times lower than this concentration.

6. A method of claim 1, wherein the treatment temperature is 20°–100° C. and the treatment time is 90–12 hours.

7. A method of claim 1, wherein the electrolyte is 0.01–1 M Na$_2$HAs$_2$O$_4$ or Na$_2$HPO$_4$ and the polyvalent cation is $3 \times 10^{-4}$ to $1 \times 10^{-3}$ M Al$^{+3}$.

8. A method of claim 1, wherein the silicate glass surface treated has a borosilicate glass composition.

9. A method of claim 1 or 8, wherein the silicate glass surface is a surface of a laser system optical element.

10. A method of claim 9, wherein the optical element is for use in a high energy laser.

11. A method of claim 1, further comprising, prior to said treatment step, pretreating the silicate glass surface with an aqueous solution as defined in claim 1 except containing essentially none of said polyvalent cation, whereby said surface is modified.

12. A method of claim 1 or 11 which is for preparing an antireflective surface on said silicate glass surface and then removing the same, further comprising, after said treatment step, post-treating the resultant antireflective silicate glass surface with an aqueous solution as defined in claim 1 except containing essentially none of said polyvalent cation, whereby the antireflective surface is removed.

13. A method of claim 12, wherein the aqueous solution used in the surface removal step is the same as that used in the treatment for applying the antireflective surface except for the polyvalent cation.

14. A method of claim 1, wherein the silicate glass surface is on a substrate which is not composed of silicate glass containing at least 5 wt % of alkali metal.

15. A method of claim 1, wherein said aqueous solution further comprises silicic acid.

16. A method of claim 1 which is conducted in a container which is inert to said aqueous solution.

17. A method of claim 2 which conducted in a container which is is inert to said aqueous solution.

18. A method of claim 3 which is conducted in a container which is inert to said aqueous solution.

19. A method of claim 7 which is conducted in a container which is inert to said aqueous solution.

* * * * *